United States Patent
Beuerlein

[19]

[11] Patent Number: 5,867,550
[45] Date of Patent: Feb. 2, 1999

[54] PROCESS FOR THE PRODUCTION OF A SCREEN PLATE FOR A FUEL ASSEMBLY FOOT AND CORRESPONDING FUEL ASSEMBLY

[75] Inventor: Bernd Beuerlein, Erlangen, Germany

[73] Assignee: Siemens Aktiengesellschaft, Munich, Germany

[21] Appl. No.: 954,952

[22] Filed: Oct. 21, 1997

Related U.S. Application Data

[62] Division of Ser. No. 459,278, Jun. 2, 1995.

[30] Foreign Application Priority Data

Dec. 2, 1992 [DE] Germany .......................... 42 40 537.8

[51] Int. Cl.$^6$ ................................................. G21C 19/307
[52] U.S. Cl. ........................................... 376/313; 376/352
[58] Field of Search .................................. 376/352, 313, 376/443, 440, 462

[56] References Cited

U.S. PATENT DOCUMENTS

| | | | |
|---|---|---|---|
| 4,664,880 | 5/1987 | Bryan ....................................... | 376/352 |
| 4,678,627 | 7/1987 | Rylatt . | |
| 4,684,495 | 8/1987 | Wilson et al. . | |
| 4,828,791 | 5/1989 | DeMario ................................. | 376/252 |
| 4,832,905 | 5/1989 | Bryan et al. . | |
| 5,030,412 | 7/1991 | Yates et al. . | |
| 5,037,605 | 8/1991 | Riordan, III ............................ | 376/352 |
| 5,094,802 | 3/1992 | Riordan, III ............................ | 376/352 |
| 5,225,152 | 7/1993 | Verdier . | |
| 5,345,483 | 9/1994 | Johansson et al. ..................... | 376/313 |
| 5,524,031 | 6/1996 | Kilian .................................. | 376/313 X |
| 5,528,640 | 6/1996 | Johansson et al. ..................... | 376/313 |

FOREIGN PATENT DOCUMENTS

| | | | |
|---|---|---|---|
| 0 422 950 A1 | 4/1991 | European Pat. Off. . | |
| 0 435 744 A1 | 7/1991 | European Pat. Off. . | |
| 0466553 | 1/1992 | European Pat. Off. ............... | 376/313 |
| 0 512 137 A1 | 11/1992 | European Pat. Off. . | |
| 0512132 | 11/1992 | European Pat. Off. ............... | 376/313 |
| 1188527 | 9/1959 | France . | |
| 60-162985 | 8/1985 | Japan ..................................... | 376/313 |
| 1162648 | 8/1969 | United Kingdom . | |
| 2 214 842 | 8/1989 | United Kingdom . | |

Primary Examiner—Charles Jordan
Assistant Examiner—Matthew J. Lattig
Attorney, Agent, or Firm—Herbert L. Lerner; Laurence A. Greenberg

[57] ABSTRACT

In a fuel assembly for a nuclear reactor and a process for the production of a screen plate for a foot of the fuel assembly, a particle trap is disposed in the foot of the fuel assembly in order to protect fuel rods of the fuel assembly from damage by foreign bodies. The particle trap is formed of a one-piece screen plate into which holes in the screen plate are worked by electrochemical material erosion. It is thereby possible to produce holes with geometrical dimensions and shapes which can only be achieved with difficulty in a casting process or by mechanical machining.

23 Claims, 7 Drawing Sheets

PROCESS FOR THE PRODUCTION OF A SCREEN PLATE FOR A FUEL ASSEMBLY FOOT AND CORRESPONDING FUEL ASSEMBLY

This is a division of application Ser. No. 08/459,278 filed on Jun. 2, 1995.

CROSS-REFERENCE TO RELATED APPLICATION

This application is a Continuation of U.S. application Ser. No. 08/459,278 filed Jun. 2, 1995.

BACKGROUND OF THE INVENTION

FIELD OF THE INVENTION

The invention relates to a process for the production of a screen plate for the foot of a fuel assembly, in which a cross section of the plate is matched to a cross section of the foot and screen apertures are matched to dimensions of foreign bodies to be retained. The invention also relates to a fuel assembly with a bundle of fuel rods disposed regularly next to one another in rows and columns between a head and a foot of the assembly. The fuel assembly may also have supporting structural elements, such as guide tubes or supporting fuel rods, a screen plate in the foot which may support at least some of the structural elements, extend virtually over the cross section of the bundle and be made in one piece or of plate parts disposed next to one another, and passage apertures leading from a lower to an upper surface of the screen plate for a coolant stream, the passage apertures having dimensions selected according to dimensions of foreign bodies to be screened out from the coolant stream and possibly having cross sections with corners, as in U.S. Pat. No. 5,030,412. The geometry of the holes and passage apertures guiding the coolant stream is worked into the one-piece plate by such a non-mechanical process for the erosion of material.

It is not possible to completely exclude the possibility that under particularly unfavorable circumstances foreign bodies will enter the coolant stream which is guided through the core of a nuclear reactor in order to cool the fuel assemblies. Thus, for example, metal chips originating from manufacture may still be located in the heat exchangers or other reactor components or springs, pieces of wire or other fragments can be broken off while the reactor is in operation. Such foreign bodies (or "debris") can be flushed by the coolant stream to the meshes of the spacers, in which the fuel rods within the fuel assembly are fixed. Strong vibrations, to which the fuel rods are exposed in the coolant stream, then give rise to friction (or "fretting") and damage which can lead to the destruction of fuel rods.

Accordingly, there has recently been the requirement to trap such foreign bodies by means of an appropriate screen in the fuel assembly foot through which the coolant flows.

It is proposed in U.S. Pat. No. 4,832,905 to construct a rod holder as a grid being formed of a large number of intersecting webs. That results in fine grid meshes which screen out the troublesome particles from the coolant stream flowing through. The stability requirements demand a considerable overall height of the grid, complicated welding seams between the webs of the grid and special fastenings of the supporting rods.

It is more often proposed to achieve the necessary screening-out of the foreign bodies in the fuel assembly foot by means of a specific screen disposed above or below the rod-holding plate. According to U.S. Pat. No. 4,678,627, a basket made from perforated sheet metal is mounted as a screen in the fuel assembly foot. According to U.S. Pat. No. 4,684,495, the screen is constructed as a coarse-mesh grid, but adjacent grid meshes are connected to one another by means of apertures in the grid webs and the grid webs carry straps which block the direct flow path through the grid meshes, so that the coolant stream is conveyed through the grid along winding paths, at the turns of which foreign bodies are trapped.

U.S. Pat. No. 5,030,412 describes a grid-like screen plate with horizontal longitudinal webs which are bent in a wave like manner in the (vertical) direction of the coolant stream, so that a rectilinear path through the screen plate is blocked. Those longitudinal webs are welded to transverse rods to form a grid having rectangular meshes. The screen plate is disposed underneath the rod-holding plate, but can also be produced together with the rod-holding plate as an integral casting, in which case the wavy longitudinal webs are not welded to transverse rods, but are formed on the lower edge of intersecting ribs which form a grid having elongate rectangular meshes and beyond which the longitudinal webs project on the lower surface of the grid. The ribs and longitudinal webs must be relatively thick and occupy a considerable part of the plate cross section, so that their flow resistance amounts to 50% of the flow resistance of the entire fuel assembly.

Such special constructions involve a very high outlay both in terms of production and with regard to the space requirement in the fuel assembly foot.

SUMMARY OF THE INVENTION

It is accordingly an object of the invention to provide a process for the production of a screen plate for a fuel assembly foot and a corresponding fuel assembly, which overcome the hereinafore-mentioned disadvantages of the heretofore-known methods and devices of this general type, which simplify the production of a corresponding screen plate for the foot of a fuel assembly and which provide an advantageous structure of the screen that can be produced easily for fuel assemblies with a corresponding particle screen.

With the foregoing and other objects in view there is provided, in accordance with the invention, in a process for the production of a screen plate for a foot of a fuel assembly, the improvement which comprises matching a cross section of the plate to a cross section of the foot; and electrochemically working apertures into the screen plate, with the apertures being matched to dimensions of foreign bodies to be retained, and with at least some of the apertures having cross sections with corners at least in a partial region between a lower surface and an upper surface of the plate.

Thus, it is possible to produce one-piece plates with passage apertures in a relatively simple way and with a geometry that cannot be obtained or can be obtained only with difficulty, by means of conventional mechanical methods. In the fuel assembly feet, these plates can serve preferably as rod-holding plates which hold the fuel rods (or at least the supporting structural parts, for example guide tubes or some of the fuel rods).

In accordance with another mode of the invention, the apertures are worked into the plate from the upper surface of the plate over part of their length and from the lower surface of the plate over another part of their length.

In accordance with a further mode of the invention, the passage apertures are worked in from the upper surface of the plate with a different geometry from that worked in from the lower surface. This results in passage apertures in the form of channels which can each be formed of at least two channel parts that adjoin one another, but which have completely different shapes.

With the objects of the invention in view, there is also provided a fuel assembly for a nuclear reactor, comprising a fuel assembly head and a fuel assembly foot; a bundle of mutually parallel fuel rods being held between the fuel assembly head and the fuel assembly foot, being disposed regularly next to one another in rows and columns and defining a bundle cross section; and supporting structural elements, such as guide tubes or supporting fuel rods; each four of the fuel rods and the structural elements defining an interspace therebetween; the fuel assembly foot having a screen plate supporting at least some of the structural elements and extending substantially over the bundle cross section in one piece or with partial plates disposed laterally next to one another; the screen plate having upper and lower surfaces and having passage apertures leading from the lower surface to the upper surface for a coolant stream, the passage apertures having dimensions being selected according to dimensions of foreign bodies to be screened out from the coolant stream and the passage apertures having cross sections with corners; and each of a plurality of the passage apertures having a uniformly continuous cross section opening out into a respective one of the interspaces and leading mutually separately from the lower surface to the upper surface.

With the objects of the invention in view, there is additionally provided a fuel assembly for a nuclear reactor, comprising a fuel assembly head and a fuel assembly foot; a bundle of mutually parallel fuel rods being spaced apart by a given distance, being held between the fuel assembly head and the fuel assembly foot, being disposed regularly next to one another in rows and columns and defining a bundle cross section; and supporting structural elements, such as guide tubes or supporting fuel rods; the fuel assembly foot having a screen plate supporting at least some of the structural elements and extending substantially over the bundle cross section in one piece or with partial plates lying next to one another; the screen plate having upper and lower surfaces and having passage apertures leading from the lower surface to the upper surface for a coolant stream, the passage apertures having dimensions being selected according to dimensions of foreign bodies to be screened out from the coolant stream and the passage apertures having cross sections with corners; the screen plate having continuous holes formed therein with approximately round or approximately quadratic cross sections being matched to the given distance; and plane webs being worked out from the screen plate and subdividing the holes into the passage apertures, in a partial region between the lower surface and the upper surface.

With the objects of the invention in view, there is furthermore provided a fuel assembly for a nuclear reactor, comprising a fuel assembly head and a fuel assembly foot; a bundle of mutually parallel fuel rods being disposed between the fuel assembly head and the fuel assembly foot and defining a bundle cross section; the fuel assembly foot having a screen plate extending substantially over the bundle cross section in one piece or with partial plates lying next to one another; the screen plate having upper and lower surfaces and having holes leading from the lower surface to the upper surface for a coolant stream, the holes having dimensions being selected according to dimensions of foreign bodies to be screened out from the coolant stream; and different webs passing through the holes at least in two planes lying between the lower surface and the upper surface.

With the objects of the invention in view, there is also provided a fuel assembly for a nuclear reactor, comprising a fuel assembly head and a fuel assembly foot; a bundle of mutually parallel fuel rods being disposed between the fuel assembly head and the fuel assembly foot and defining a bundle cross section; the fuel assembly foot having a screen plate extending substantially over the bundle cross section in one piece or with partial plates; and the screen plate having upper and lower surfaces and having continuously curved passage channels leading from the lower surface to the upper surface.

A fuel assembly according to the invention therefore has a bundle of mutually parallel fuel rods which is disposed between a fuel assembly head and a fuel assembly foot, the fuel assembly foot containing a plate with passage apertures for a coolant stream and the passage apertures leading from the lower surface to the upper surface of the plate and having a size corresponding to the dimensions of the foreign bodies to be screened out from the coolant stream. This plate can extend as a single, for example cast or rolled piece, over the entire bundle cross section and be formed or welded on the fuel assembly foot. However, it can also be composed of a plurality of one-piece partial plates which are disposed next to one another in the foot. The shape of the passage apertures is no longer restricted to a geometry which can be produced by drilling in one-piece plates. On the contrary, other geometries which, in particular, better satisfy the requirements demanded of the rod-holding plates in fuel assembly feet, can now also be obtained.

Thus, preferably at least some of the passage apertures have a polygonal cross section at least in a partial region between the lower surface and the upper surface.

According to one variant of the invention, relatively large holes (particularly circular holes), are provided in the plate as passage apertures through which separate webs pass in at least two planes lying between the upper surface and the lower surface of the plate, and the webs of one plane can be disposed in a geometrically different way, for example offset, in relation to the webs of the other plane.

Other features which are considered as characteristic for the invention are set forth in the appended claims.

Although the invention is illustrated and described herein as embodied in a process for the production of a screen plate for a fuel assembly foot and corresponding fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 15 is a fragmentary, perspective view of a plate part having winding passage channels.

DESCRIPTION OF THE PREFERRED EMBODIMENTS

Figure 1:
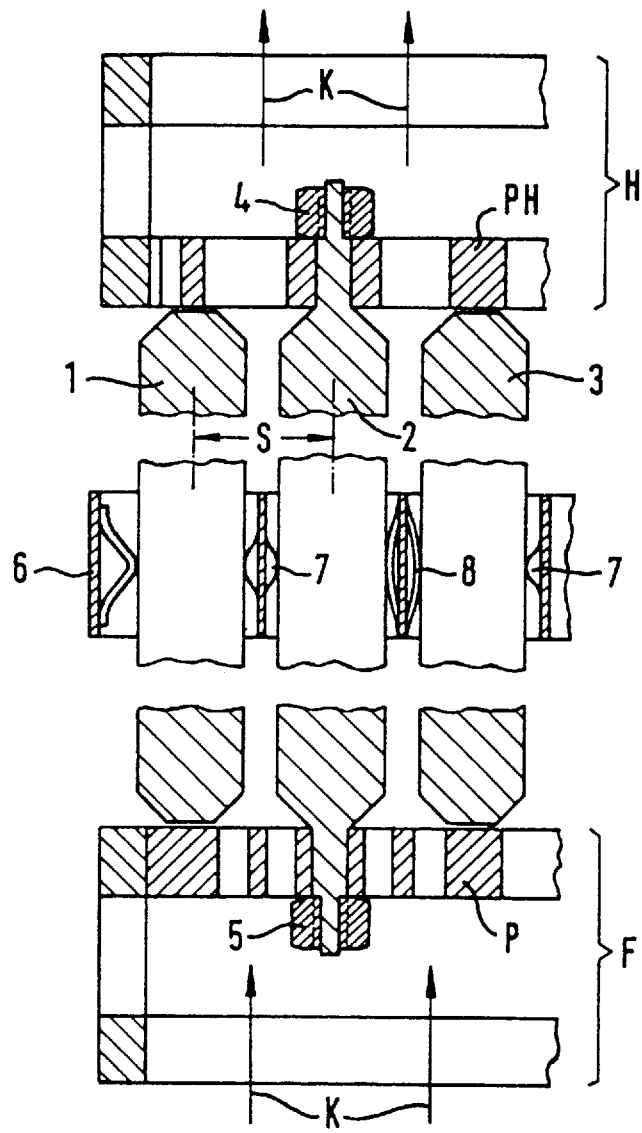
FIG. 1 is a fragmentary, diagrammatic, longitudinal-sectional view of a left-hand side of a fuel assembly.

Referring now to the figures of the drawing in detail and first, particularly, to FIG. 1 thereof, there is seen a longitudinal section through a left-hand part of a water—cooled fuel assembly, through which a coolant stream flows in the direction of arrows K. A bundle of mutually parallel fuel rods 1, 2, 3 is disposed between a fuel assembly head H and a fuel assembly foot F. In the case of boiling-water fuel assemblies, for example, the fuel rod 2 is constructed as a supporting rod which is screwed on an upper end piece through a thread with a nut 4 and on a lower end piece through another thread with a nut 5 to rod-holding plates PH, P respectively disposed in the fuel assembly head H and the fuel assembly foot F. However, instead of using supporting fuel rods as a support in a fuel assembly, it is also possible to use guide tubes of pressurized-water fuel assemblies, water pipes or other structural parts which fix the head and the foot of the fuel assembly in such a way that the fuel rods are clamped between them. The fuel rods are fixed laterally in a plurality of axial positions by spacers 6 being formed of grid-like webs, on which the fuel rods are supported through knobs 7 and springs 8. Compression springs which allow a length compensation of the fuel rods in the event of temperature fluctuations, and other conventional parts of fuel assemblies which are of no importance to the invention, are not shown in FIG. 1.

Figure 2:
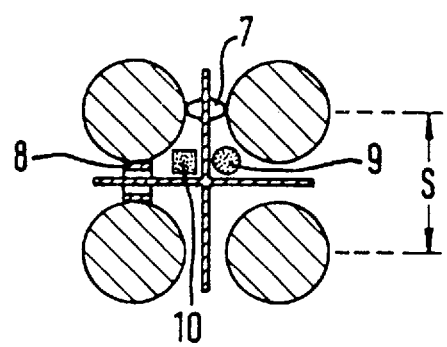
FIG. 2 is a cross-sectional view showing spatial relationships in an interspace between four adjacent fuel rods.

FIG. 2 diagrammatically shows an interspace between four adjacent fuel rods and two webs of the spacer which intersect in that interspace, with corresponding knobs 7 and springs 8. Reference numerals 9 and 10 respectively denote a cylindrical and a quadratic foreign body, having cross sections with dimensions that permit the particular foreign body, which is driven through the fuel assembly by the coolant stream K, to just avoid being trapped on the spacers. It is therefore advantageous if there is a screen in the fuel assembly foot which during all events screens out particles from the coolant stream having larger dimensions than are considered harmless for passing through the spacers.

On one hand, the rod-holding plates must have sufficient stability and, on the other hand, they should not cause too high a pressure loss in the coolant flowing through them. The result thereof is that the passage apertures for the coolant stream which are provided in the plates take up a sufficiently large fraction of the total fuel assembly cross section, but the webs between the passage apertures must have a sufficient width and thickness. If the lower rod holder is also utilized to trap the foreign bodies from the coolant stream, the entire flow cross section available for the passage of coolant in the foot must be distributed over correspondingly small and numerous passage apertures. However, that requirement can only be implemented with difficulty.

Thus, for example, the foot is often produced as a one-piece casting including the rod-holding plate and a corresponding frame. Even in the case of conventional constructions, those castings have to be reworked frequently. The more passage apertures that are provided and the narrower the webs located between them, the higher the corresponding production outlay becomes.

A rod-holding plate having a thickness of several centimeters, with passage apertures which are disposed next to one another and the maximum diameter of which according to FIG. 2, is only approximately 3 mm, would usually have so many casting faults arising from a casting process that it would no longer be economically practicable to eliminate them subsequently.

A higher accuracy can be achieved if the rod-holding plate is first produced without the passage apertures which are subsequently worked into the plate by the mechanical erosion of material. Thus, for example, appropriately small bores can be made in a rolled plate to be inserted into the frame of the foot part. However, only rectilinear holes of round cross section can be produced in that way.

In machine-building, it has been known for some years that a metallic semifinished product for machine parts can be given a complicated geometry by means of controlled electrolytic dissolving of the metal. That involves machining methods which have heretofore been used only in special cases and which are known, for example, as "electrochemical counter-sinking" (or "Electro-Chemical Machining" ECM).

Figure 3:
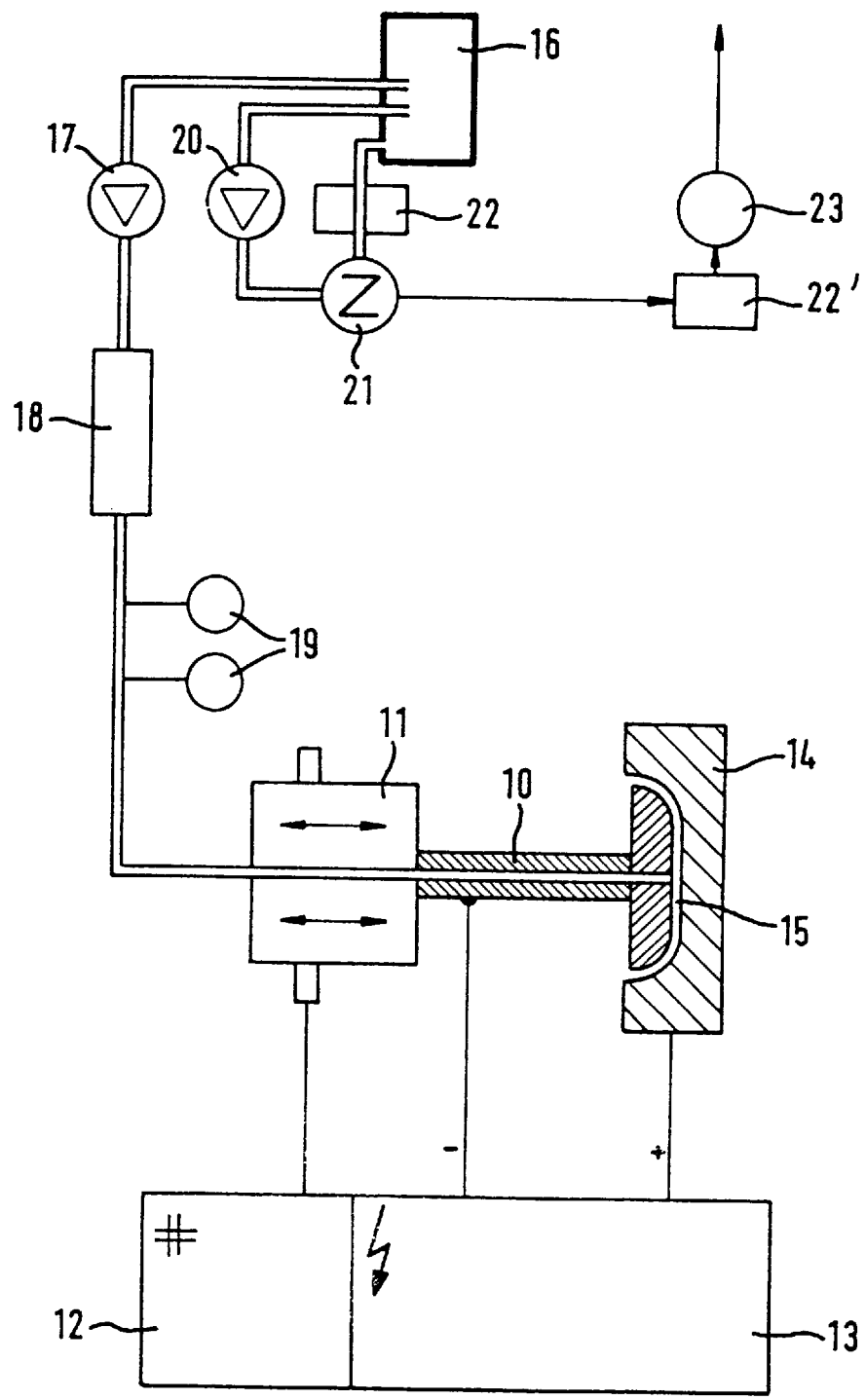
FIG. 3 is a diagrammatic and schematic circuit diagram of an apparatus for electrochemical countersinking ("electrochemical machining")

According to FIG. 3, a diagram of an ECM apparatus of this type includes an electrode 10 which is placed onto a workpiece 14 by a feed device 11 being controlled by a control device 12. The electrode 10 and the workpiece 14 are connected to a direct-voltage generator 13.

Introduced into a gap 15 between the electrode and the workpiece is an electrolyte, in which the metal of the workpiece 14 dissolves according to the feed and the shape of the electrode 10.

An electrolyte circuit is indicated in FIG. 3 by an electrolyte tank 16, a conveying pump 17, a filter 18 and measuring instruments 19 for the pressure and the temperature of the electrolyte. A pump 20 can drive a further circuit in parallel with the electrolyte circuit. The further circuit leads through a centrifuge 21 and a heat exchanger 22 and ensures a sufficient supply of temperature-regulated purified electrolyte.

Ions of the dissolved metal form a sludge in the electrolyte. The sludge can be separated off by means of the centrifuge 21, pumped away into a filter press 22' and supplied to a further station 23 for retreatment or disposal.

Corresponding commercial machining stations are offered by special companies (see the offprint from the publication Haus der Technik e.V., Essen 1984, entitled "Elektrochemisches Senken (ECM) in der Anwendung" ["Electrochemical Countersinking (ECM) in Use"] by G. Pielorz, Maschinenfabrik K"ppern, Hattingen).

Figure 4:
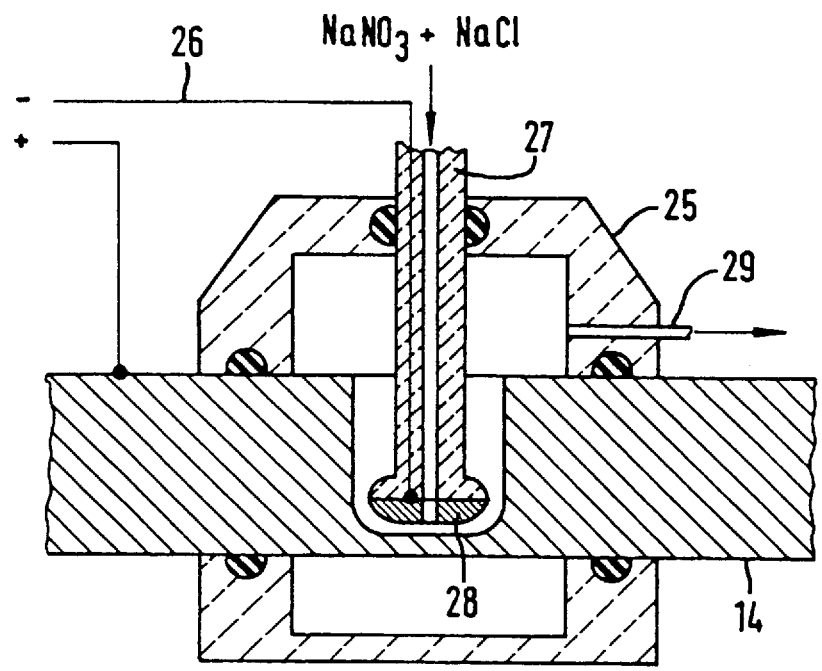
FIGS. 4 and 5 are fragmentary, sectional views of two exemplary embodiments of workpieces and tools for electrochemical countersinking.

According to FIG. 4, the electrolyte circuit can be guided through a working chamber 25 which can be placed onto the workpiece 14 in a pressure-tight manner at the machining point. The metallic workpiece itself is supplied as an anode with a direct current of between approximately 0.5 and 5 A/mm2, while a cathode connection is guided, together with a feed rod 27, into the working chamber. Profile parts 28 which are made of metals, such as copper or steel, or which may also be made of graphite, are used as a cathode. The electrode according to FIG. 4 has an inner flushing channel, through which the electrolyte (for example, sodium nitrate and/or sodium chloride) is forced at a pressure of between 5 and 20 bar into the gap between the electrode 28 and the workpiece 14. At electrolyte temperatures of between approximately 30° and 50° C. and at working voltages of between 7 and 20 volts, feed speeds of up to 5 mm/min can be achieved. The electrode imprints its profile onto the workpiece with an accuracy of approximately 0.1 mm. The spent electrolyte is discharged through a discharge conduit 29.

The electrolyte can also be discharged through a flow channel in the electrode 28 in a reversal of the direction of flow or it can be guided through the machining point in another way, for example transversely to the feed direction.

Large quantities of material can be eroded in relatively short times by means of this method of electrochemical dissolving. In contrast to other erosion methods, for example spark erosion, virtually no wear occurs on the tool (the electrode). Mechanical forces, which could deform the workpiece, or chemical influences, which could change the composition and contour of the material, do not arise. In particular, the hardness of the workpiece, which under certain circumstances necessitates special tools in the case of mechanical machining, is of no importance. Workpieces up to a diameter of 50 cm can be machined without difficulty.

However, an ECM machining apparatus is relatively expensive in comparison with other machining stations. Additionally, the optimization of the cathode shape can be relatively complicated, with the result that small-quantity series involve a high outlay.

In order to produce more complicated geometries, it can be beneficial to carry out the production of the requisite screen profile in a plurality of work steps. Thus, it is assumed in FIG. 5 that, in a preparatory work step, small guide channels 33 extending through the entire thickness of a one-piece plate 30 have been worked-in. The guide channels are then subsequently widened from the lower surface by means of cathodes of corresponding size to a depth defined by a plane A—A. Relatively wide channels 31 are therefore worked in from below in a part of the one-piece plate 30 located below the plane A—A. Through the use of cathodes 32, remaining parts of the small guide channels 33 are then also widened from the upper surface, with the result that passage channels 34, which can then differ in their geometric shape from the channels 31 of the lower surface, are also worked into the upper part of the plate 30. If the electrodes 32 are lowered beyond the plane A—A, passage apertures having complicated profiles are thereby obtained.

Figure 5:
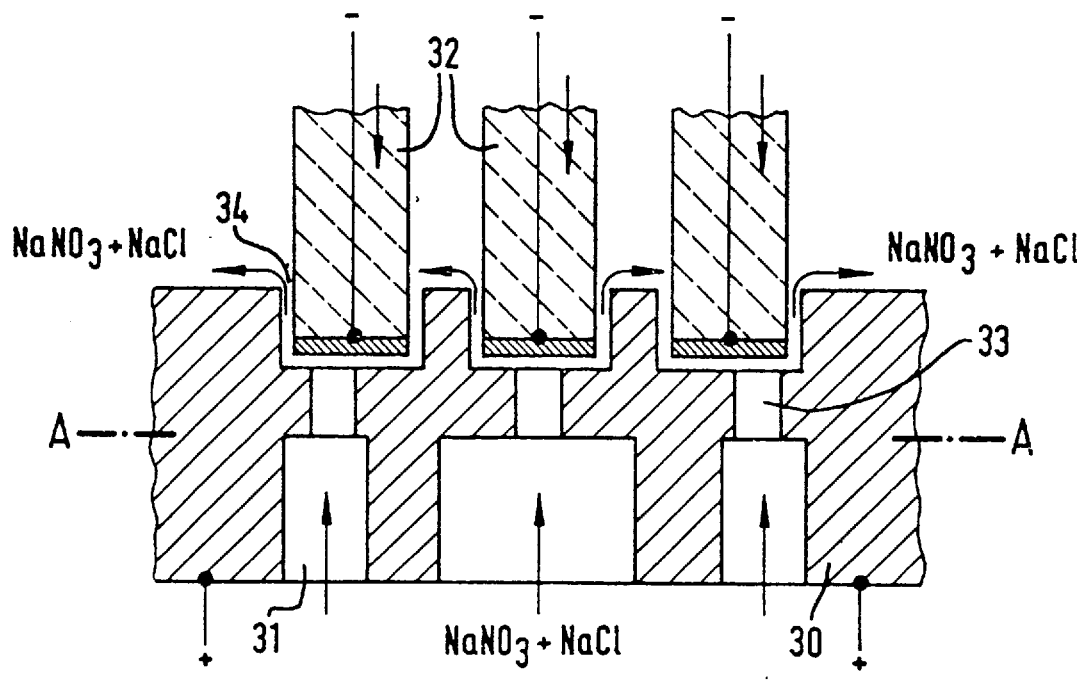

FIG. 5 furthermore shows a guidance of the electrolyte stream which avoids the need for corresponding supply channels in the electrodes. Since the feed of the electrodes does not necessarily have to take place perpendicularly to the plate, but the electrode can also be moved obliquely or laterally, virtually all shapes of passage apertures can be worked into a plate.

Figure 6:
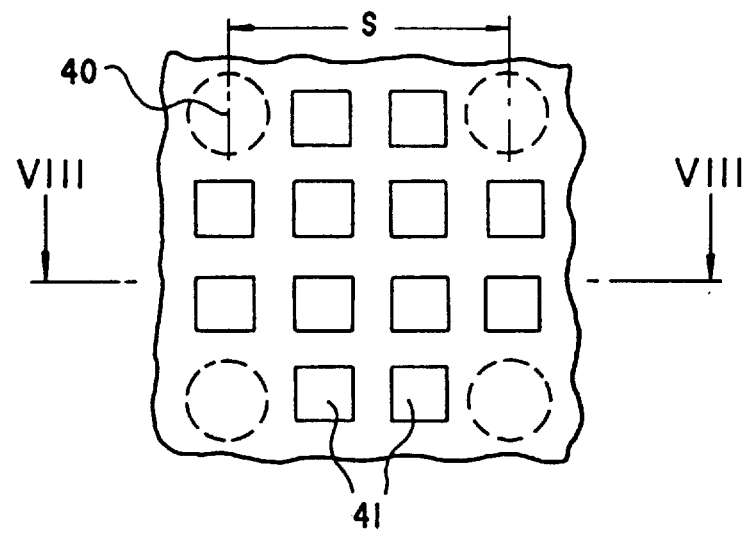
FIGS. 6 and 7 are fragmentary, elevational views of two screen-plate geometries with angular passage apertures.
Figure 7:
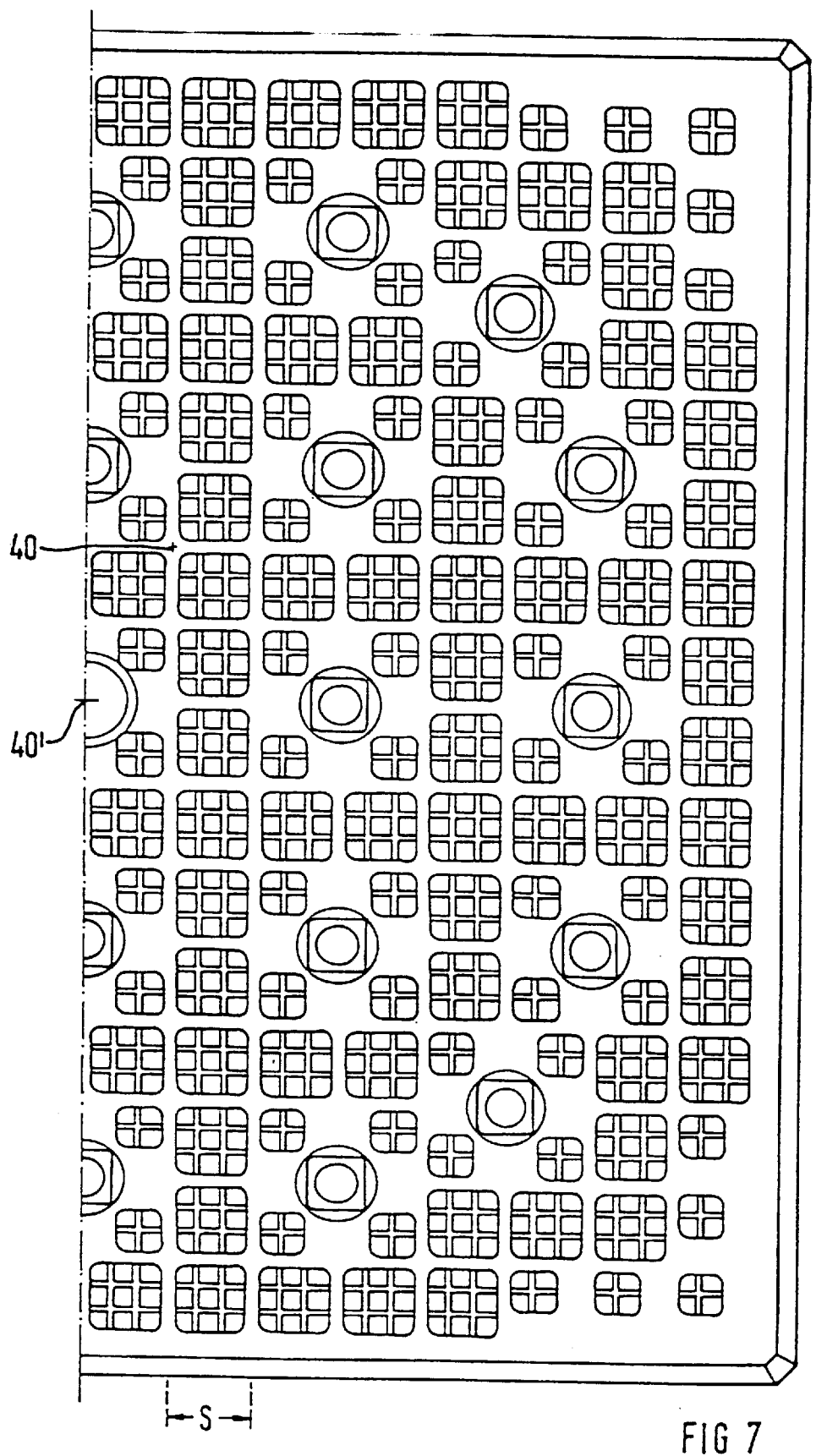

In FIGS. 6 and 7, reference symbol S indicates a "rod division" of the fuel assemblies, that is to say a distance between a fuel-rod axis and an axis of an adjacent fuel rod or guide tube. Positions 40, 40' on the screen plate 30 which correspond to these axes serve as a stop or for fastening the fuel rods or guide tubes and are therefore available only to a restricted extent for passage apertures.

FIG. 6 shows how the distance S between these positions is utilized by quadratic passage apertures 41. If drilled, that is to say if circular passage apertures were used, the width of the webs remaining between the apertures, which width is necessary for equal mechanical stability, would permit only passage apertures having cross-sectional surfaces that as a whole form a clearly smaller flow cross section.

FIG. 7 shows a top view of half of a screen plate extending through the fuel assembly foot, in which the available surface between the positions 40' of guide tubes or holding rods is equipped with angular passage apertures 41 in light of the necessary stability and of a sufficient distribution of the coolant stream.

Figure 8:
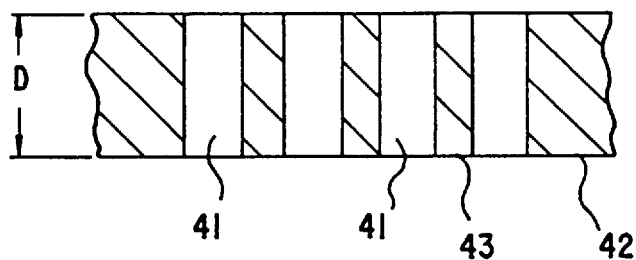
FIGS. 8 and 9 are fragmentary, longitudinal-sectional views of two screen plates with webs which extend from an lower surface to an upper side of the plate.

FIG. 8 shows a section of the screen plate which is taken along a line VIII of FIG. 6, in the direction of the arrows. The passage apertures 41 can be countersunk from one side of a plate 42 in one operation. The plate 42 then forms webs 43 which extend rectilinearly over the entire length of the passage apertures, that is to say through a thickness D of the plate.

Figure 9:
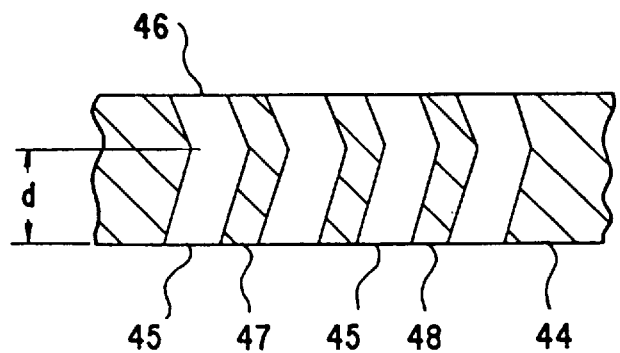

Channels 45 have first been countersunk from the lower surface into a plate 44 of FIG. 9, in order to subsequently work-in corresponding channels 46 to a depth d from the upper surface. The feed directions in the two operations form an angle, so that correspondingly angled passage apertures are obtained in the plate. Webs 48 formed by the plate 44 between the passage apertures can extend rectilinearly in the screen-plate plane (that is to say in the plane of the drawing of FIG. 8) and intersect one another, but they are bent or angled perpendicularly to the plate plane.

Figure 10A:
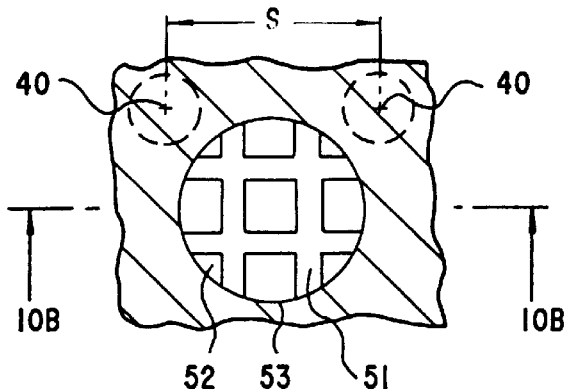
FIGS. 10a and 10b show a cross-sectional and a longitudinal-sectional view of a screen plate with circular holes, through which webs pass over some of their length.
Figure 10B:
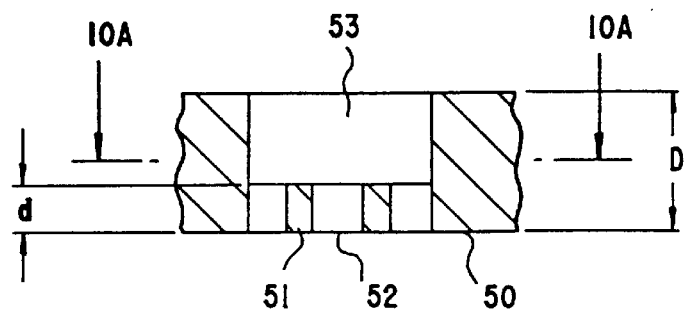

FIG. 10a shows a cross-sectional view and FIG. 10b shows a longitudinal-sectional view, through a screen plate that is likewise produced in two operations, wherein lines 10B and 10A indicate respective sectional planes.

In this case, channels 52 are worked into a plate 50 in one operation, so that the plate 50 forms rectilinear intersecting webs 51 between these channels 52. However, before or after this operation, a hole 53 covering a plurality of channels 52 is worked in from the surface in another operation and, in each case, acts as a common aperture part to connect a plurality of passage apertures (channels 52) to the upper surface. The webs 51 formed by the plate then therefore extend only over a partial length d of the passage apertures, having a total length D. While the holes 53 can be round, on a plurality of passage apertures the cross sections have corners which are obtained as a result of the rectilinear narrow webs 51.

The size of the holes 53 and their distribution on the screen plate are selected, irrespective of the dimensions of the foreign bodies to be retained, so as to ensure the desired load-bearing capacity of the screen plate 50. However, at least in one plane between an upper surface and a lower surface of the plate 50, the plate forms the rectilinear webs 51 which subdivide the large holes according to the dimensions of the foreign bodies to be retained. The pressure loss brought about by these webs 51 remains low.

Figure 11:
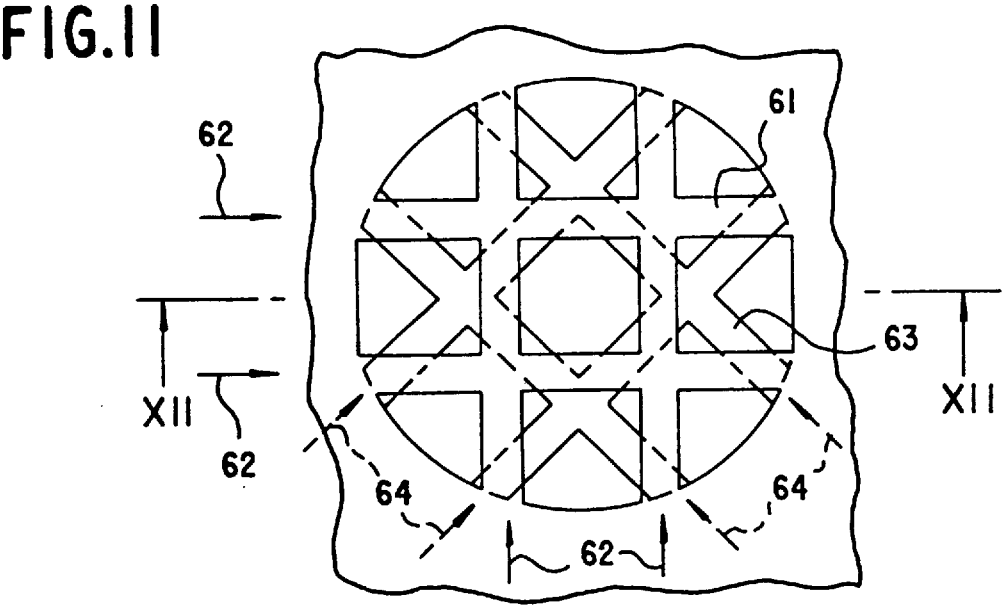
FIGS. 11 and 12 are respective top and longitudinal-sectional views of a screen plate with holes and with two mutually offset sets of webs which pass through the holes in two planes lying one above the other.
Figure 12:
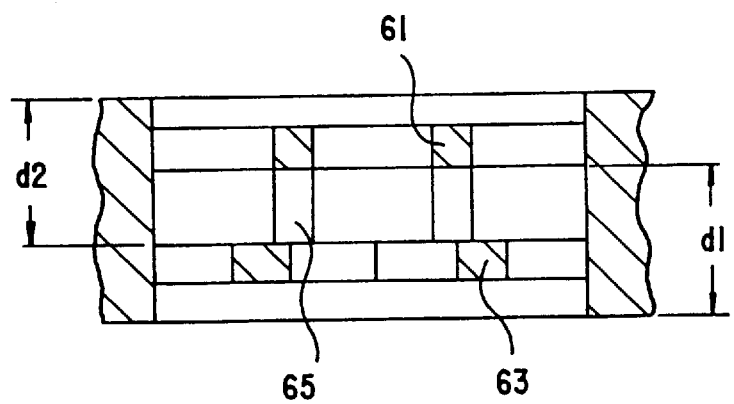

FIG. 11 shows a top view of another screen plate that is likewise formed in a plurality of operations, and FIG. 12 shows a longitudinal section taken along a plane G—G in FIG. 11. It is evident from these figures that the screen plate carries a hole, preferably a round hole, through which webs, preferably straight intersecting webs, pass between the upper surface of the plate and the lower surface of the plate in two planes lying one above the other. In the upper of these two planes, the plate forms four webs 61 which extend along arrows 62, while webs 63 of the lower plane run along arrows 64. The webs 61 and the passage channels formed between them correspond to the geometry of the channels forming the webs 61 into the plate from above to a depth d2.

Thus, in the region of overlap of the two machining depths d1 and d2, only pin-like residues 65 remain of the material of the screen plate and connect the webs 61 of the upper web plane to the webs 63 of the lower web plane. In the region of the upper surface and/or the lower surface of the screen plate, the material of the webs 61 and 63 can be additionally eroded, so that the webs 61 and 63 are set back relative to the upper surface and the lower surface of the plate and are protected.

The position of the tool in the workpiece, as is shown in FIG. 5, corresponds to the production of a screen plate according to FIG. 12, in which the two depths of penetration d1 and d2 each correspond to half the plate thickness D. After completion, this plate then likewise has the top view shown in FIG. 11, but the set of intersecting webs 63 is then located directly under the set of intersecting webs 61. As a result, the stability of the webs passing through the round holes increases, but at the same time a slight increase in the pressure drop also occurs.

Figure 13A:
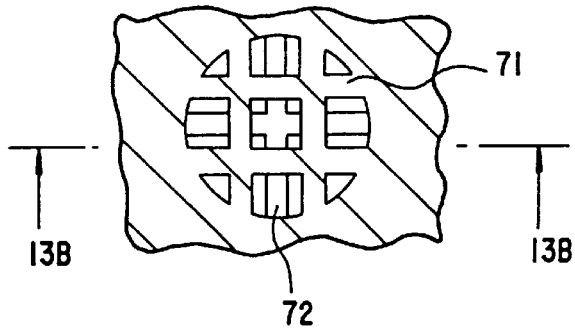
FIGS. 13a, 13b and 14 are similar views of screen plates, in which the two sets of webs have even more different geometries.
Figure 13B:
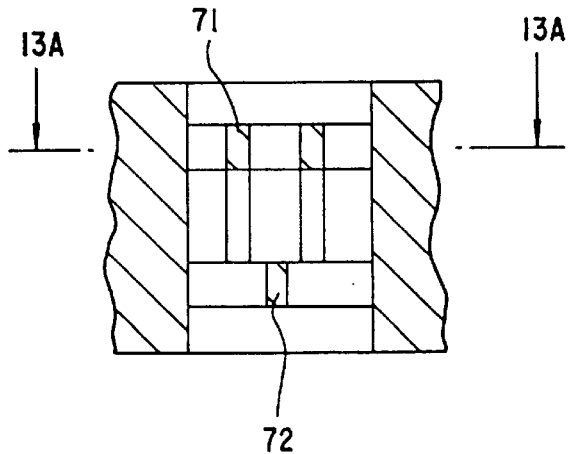

FIGS. 13a and 13b show a very similar screen plate, but in which the passage apertures or passage channels are worked out of the plate in such a way that four webs 71 disposed in a grid-like manner are provided in an upper intermediate plane, but only two intersecting webs 72 are provided in a plane disposed underneath, that is to say a completely different geometry is present in the two planes.

Figure 14:
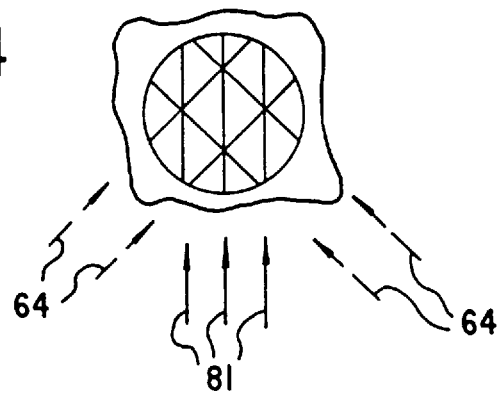

FIG. 14 diagrammatically shows a top view of a hole, in which the respective webs 61 and 71 of FIGS. 11 and 13a, that intersect in one plane, are replaced by rectilinear webs being parallel to one another along arrows 81, while the webs provided along the arrows 64 in FIG. 11 are maintained in the other plane.

A feature which is common to the passage channels of FIGS. 9 to 14 is that the passage apertures do not extend rectilin-early with a constant cross section through the screen plate, but have narrowings, offsets and/or bends, so that pieces of wire and other elongate foreign bodies of small cross section are trapped therein. All of these geometries can be worked into a one-piece plate, thus considerably reducing the outlay in terms of time and labor during production.

This also applies to passage channels which form a continuously curved connection of the lower surface of the plate to the upper surface of the plate, preferably a helical connection winding about an axis or in a similarly spatial manner.

Thus, for example, the tool for electrochemical countersinking can have electrodes which represent sectors of a circular surface and which, when placed onto the plate surface, produce an approximately circular hole being subdivided into sectors by webs 91, 92, as is shown diagrammatically in FIG. 15 by means of a piece of such a plate. However, passage channels 93, 94 are not worked into the plate by means of a linear feed of the electrodes, as a result of which rectilinear passage channels would be produced. On the contrary, the electrodes themselves are of corkscrew-like construction and are countersunk into the plate by superposing a linear feed movement on a rotational movement.

This results in helically winding passage apertures, as is indicated in FIG. 15 by corresponding spiral lines 95 and 96.

While in practice the complex geometries of FIGS. 12 to 15 can only be achieved by means of non-mechanical methods of material erosion, in principle the simpler geometries of FIGS. 6 to 11 could also be produced in another way. In practice, however, this is forestalled by the dimensions that are necessary for screen plates of this type. Thus, in the case of conventional fuel assemblies with a rod division of 2 to 3 cm, for example quadratic screen apertures having a side length of approximately 3 mm are expedient. A web thickness of at most approximately 0.8 mm is then possible for the narrow webs of FIGS. 7 to 15, since the mechanical stability of the screen plate of course also necessitates even thicker webs which have a higher load-bearing capacity and which must absorb the forces emanating from supporting rods, guide tubes or other structural parts. In the case of a thickness of the screen plate of a few centimeters, which is required as a result, stamping or forming processes are ruled out. Cast plates of these geometries exhibit virtually unavoidable casting faults and have to be thoroughly reworked in a manner involving a high outlay, in such a way that a screen plate as part of the supporting skeleton of a fuel assembly cannot be produced economically in this way, in practice.

However, electrochemical countersinking makes it possible to satisfy the contradictory requirements (large passage cross section for coolant, small screen apertures for trapping foreign bodies, sturdy construction for absorbing supporting forces) in various advantageous ways, without an excessive outlay in terms of production.

I claim:

1. A fuel assembly for a nuclear reactor, comprising:
   a fuel assembly head and a fuel assembly foot;
   a bundle of mutually parallel fuel rods being held between said fuel assembly head and said fuel assembly foot, being disposed regularly next to one another in rows and columns and defining a bundle cross section; and
   supporting structural elements;
   each four of said fuel rods and said structural elements defining an interspace therebetween;
   said fuel assembly foot having a screen plate supporting at least some of said structural elements and extending substantially over the bundle cross section;
   said screen plate having upper and lower surfaces and having passage apertures formed therein leading from said lower surface to said upper surface for a coolant stream, said passage apertures having dimensions being selected according to dimensions of foreign bodies to be screened out from the coolant stream and said passage apertures having cross sections with corners; and
   each of a plurality of said passage apertures having a uniformly continuous cross section opening out into a respective one of said interspaces and leading mutually separately from said lower surface to said upper surface.

2. The fuel assembly according to claim 1, wherein said structural elements are guide tubes.

3. The fuel assembly according to claim 1, wherein said structural elements are supporting fuel rods.

4. The fuel assembly according to claim 1, wherein said screen plate is formed of a rigid metal plate.

5. The fuel assembly according to claim 1, wherein said screen plate is formed of partial plates disposed laterally next to one another.

6. The fuel assembly according to claim 1, wherein said passage apertures are quadratic, and none of said passage apertures are disposed underneath axes of said fuel rods.

7. A fuel assembly for a nuclear reactor, comprising:

a fuel assembly head and a fuel assembly foot;

a bundle of mutually parallel fuel rods being spaced apart by a given distance, being held between said fuel assembly head and said fuel assembly foot, being disposed regularly next to one another in rows and columns and defining a bundle cross section; and supporting structural elements;

said fuel assembly foot having a screen plate supporting at least some of said structural elements and extending substantially over the bundle cross section;

said screen plate having upper and lower surfaces and having passage apertures formed therein leading from said lower surface to said upper surface for a coolant stream, said passage apertures having dimensions being selected according to dimensions of foreign bodies to be screened out from the coolant stream and said passage apertures having cross sections with corners;

said screen plate having continuous holes formed therein with cross sections being matched to said given distance; and plane webs being worked out from said screen plate and subdividing said holes into said passage apertures, in a partial region between said lower surface and said upper surface.

8. The fuel assembly according to claim 7, wherein said cross sections of continuous holes are approximately round.

9. The fuel assembly according to claim 7, wherein said cross sections of continuous holes are approximately quadratic.

10. The fuel assembly according to claim 7, wherein said structural elements are guide tubes.

11. The fuel assembly according to claim 7, wherein said structural elements are supporting fuel rods.

12. The fuel assembly according to claim 7, wherein said screen plate is formed of a rigid metal plate.

13. The fuel assembly according to claim 7, wherein said screen plate is formed of partial plates lying next to one another.

14. The fuel assembly according to claim 7, wherein said cross sections of said continuous holes are quadratic and none of said holes are disposed underneath axes of said fuel rods.

15. A fuel assembly for a nuclear reactor, comprising:

a fuel assembly head and a fuel assembly foot;

a bundle of mutually parallel fuel rods being disposed between said fuel assembly head and said fuel assembly foot and defining a bundle cross section;

said fuel assembly foot having a screen plate extending substantially over the bundle cross section;

said screen plate having upper and lower surfaces and having holes formed therein leading from said lower surface to said upper surface for a coolant stream, said holes having dimensions being selected according to dimensions of foreign bodies to be screened out from the coolant stream; and different webs passing through said holes at least in two planes lying between said lower surface and said upper surface.

16. The fuel assembly according to claim 15, wherein said screen plate is formed of a rigid metal plate.

17. The fuel assembly according to claim 15, wherein said screen plate is formed of partial plates lying next to one another.

18. The fuel assembly according to claim 15, wherein said webs in one of said planes are disposed geometrically differently from said webs in the other of said planes.

19. The fuel assembly according to claim 15, wherein said webs in one of said planes are offset relative to said webs in the other of said planes.

20. The fuel assembly according to claim 15, wherein said holes are substantially round.

21. A fuel assembly for a nuclear reactor, comprising:

a fuel assembly head and a fuel assembly foot;

a bundle of mutually parallel fuel rods being disposed between said fuel assembly head and said fuel assembly foot and defining a bundle cross section;

said fuel assembly foot having a screen plate extending substantially over the bundle cross section; and said screen plate having upper and lower surfaces and having continuously curved passage channels formed therein leading from said lower surface to said upper surface.

22. The fuel assembly according to claim 21, wherein said screen plate is formed of a rigid metal plate.

23. The fuel assembly according to claim 21, wherein said screen plate is formed of partial plates.

* * * * *